United States Patent [19]

Price et al.

[11] 3,877,821

[45] Apr. 15, 1975

[54] APPARATUS FOR DETECTING FLAWS USING AN ARRAY OF PHOTO SENSITIVE DEVICES

[75] Inventors: Stephen E. Price; Thiel J. Gomm, both of Salt Lake City, Utah

[73] Assignee: Inex, Inc., Denver, Colo.

[22] Filed: July 23, 1973

[21] Appl. No.: 381,549

[52] U.S. Cl.............. 356/237; 250/211 R; 250/563; 356/205; 356/239
[51] Int. Cl....................... G01n 21/16; G01n 21/32
[58] Field of Search ........... 356/200, 209, 210, 205, 356/212, 237, 239, 240; 250/211 R, 562, 563

[56] References Cited
UNITED STATES PATENTS

| | | | |
|---|---|---|---|
| 2,798,605 | 7/1957 | Richards............................ | 356/240 |
| 2,803,161 | 8/1957 | Summerhayes, Jr................ | 356/210 |
| 3,536,829 | 10/1970 | Gebel................................ | 250/211 R |
| 3,586,864 | 6/1971 | Brany et al. ...................... | 250/563 |
| 3,693,021 | 9/1972 | Lake, Jr. et al.................... | 356/237 |

Primary Examiner—Vincent P. McGraw
Attorney, Agent, or Firm—K. S. Cornaby

[57] ABSTRACT

An optical scanning device for producing a train of pulses whose individual signal strength or amplitude reflects unobstructed light passage and/or the presence of a crack, flaw, or foreign object in an item under inspection. The perturbation detector consists of a lens for focusing a beam of light passed through the item under inspection onto the face of a scanning array. The scanning array has arranged thereon a number of photo sensitive devices that receive the beam of light focused by the lens. A voltage potential is applied to the photo sensitive devices, each device passing a certain voltage therethrough reflective of the amount of light directed thereon. A clock provides pulses that serially interrogate each photo sensitive device producing a train of pulses that are then amplified and passed to a means for comparing the pulses, adjacent pulses of unlike amplitude indicating the presence in the item of an imperfection, such as a flaw, crack or foreign object.

4 Claims, 6 Drawing Figures

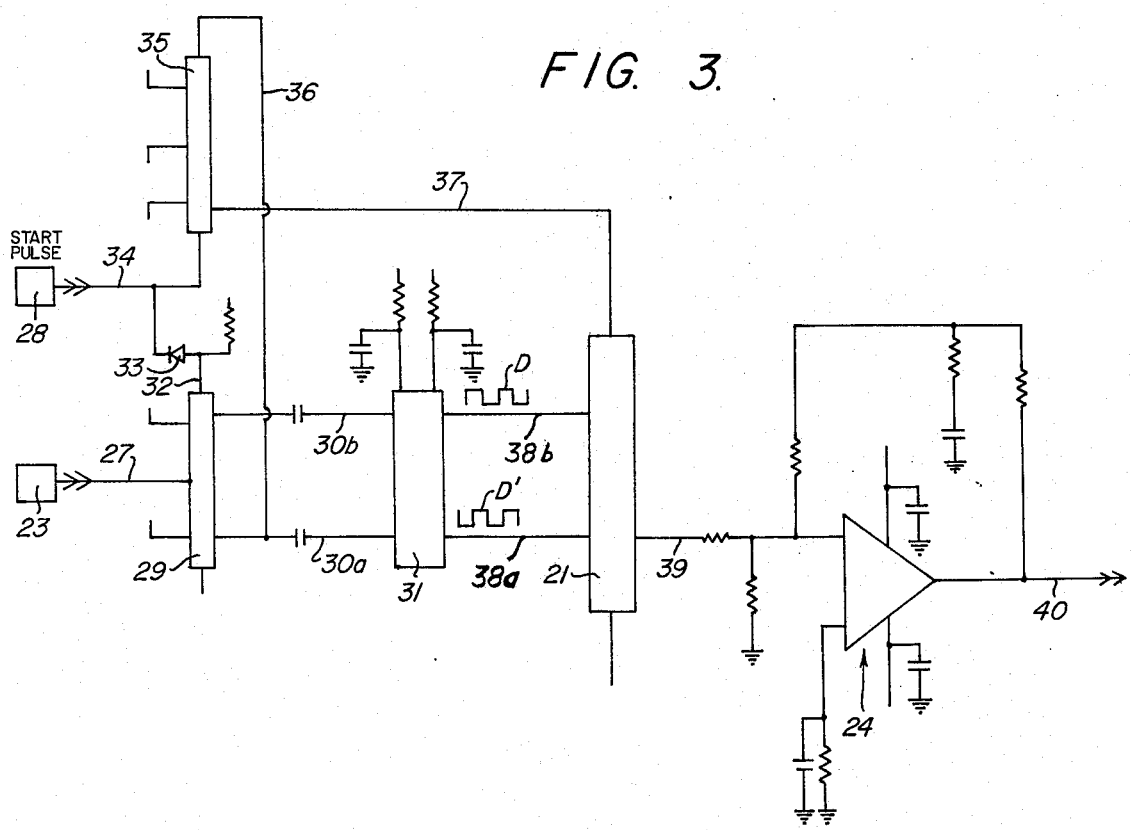
FIG. 3.
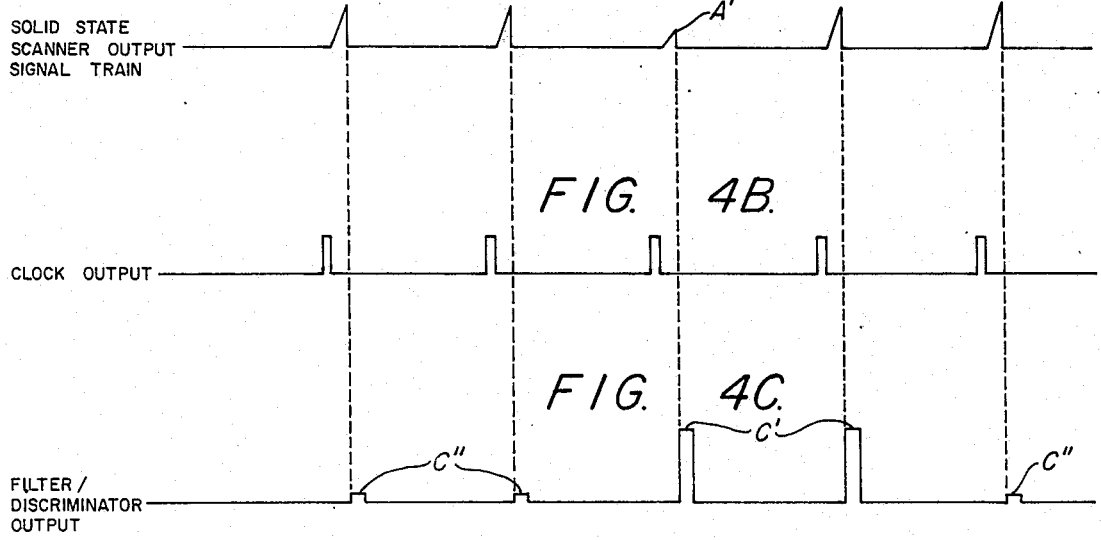
FIG. 4A.
SOLID STATE SCANNER OUTPUT SIGNAL TRAIN
FIG. 4B.
CLOCK OUTPUT
FIG. 4C.
FILTER / DISCRIMINATOR OUTPUT

APPARATUS FOR DETECTING FLAWS USING AN ARRAY OF PHOTO SENSITIVE DEVICES

BRIEF DESCRIPTION OF THE INVENTION

1. Field of the Invention

This invention relates to devices and circuitry associated therewith for detecting cracks, flaws, and foreign objects in transparent or translucent items.

2. Prior Art

Numerous devices such as those shown in U.S. Pat. Nos. 2,798,605; 3,283,898; 3,331,963; 3,365,699; 3,560,096; 3,565,536; 3,586,864; 3,708,680; and 3,716,136, all disclose circuitry including means for receiving and interpreting light passed through or directed onto an item under inspection. Such devices incorporate either a visual comparison of the item or employ a device capable of producing a resistance reflective of the intensity of light directed thereon. Whether the output of such a device is visual or electrical in nature, it is eventually compared against a model to determine if the item under inspection is suitable as to size, and construction, and is without flaws, cracks, or foreign objects. Such devices, similar to the present invention, are each intended to provide an automated inspection means for checking, as in a moving column of bottles, single or multiple objects in that moving column.

The present invention, through it is intended to perform a function similar to is of the devices of the above cited prior patents, it singularly unique in that it utilizes the item under inspection as the model. Due to the rapidity of operation of the clocking and sensing circuitry of the present invention, numerous samplings are taken of the item under inspection. Each such sampling produces a number of pulses each characteristic of light that has passed through a particular portion of the item. The amplitude of each such pulse is then compared by appropriate circuitry against pulses adjacent thereto. That comparison, in turn, produces output pulses whose amplitudes reflect the change or differences in amplitude of adjacent input pulses, which differences or changes are caused by differing light transmission properties of the item caused by the presence of a crack, flow, or foreign object in the item.

U.S. Pat. No. 3,586,864, addition to involving circuitry for producing a varying signal pulse that is dependent upon the amount of light striking upon a sensor portion thereof, like the present invention, involves comparisons of light from several parts of the item under inspection. This device also compares the differences in pulse amplitudes, but utilizes a moving light source and interprets reflected light only. The device of the aforesaid patent, as it involves means for inspecting a reflective surface, such as a mirror, does not involve a lens, nor does it involve pluralities of light sensitive pulse generating means as does the present invention, nor an arrangement for interrogating individually that light sensitive pulse generating means.

Of recent years certain sophisticated devices and circuitry have been proposed as devices for flaw detection in assembly line produced products. Specifically, in the June 2, 1973, issue of Business Week Magazine, starting on page 80, is shown a lazer system and associated circuitry that is operated by bouncing a laser beam off from an item, producing a signal that is compared against a model to discover flaws or imperfections in that item, and may include circuitry for removing that item from the other items.

SUMMARY OF THE INVENTION

It is a principal object of the present invention to provide a flaw, crack, and foreign object detector device operated by light that will produce, as the output therefrom, at train of signal pulses, each pulse reflective of the amount of light passed through portions of a transparent or translucent item and striking upon a photo sensitive portion of the device.

Another object is to provide a device incorporating a lens arranged to receive a beam of light passed through a transparent or translucent item, focusing that light onto a number of photo sensitive devices that each individually pass a voltage proportional to the amount of light striking thereon, which photo sensitive devices are serially interrogated to produce a train of pulses each reflective of the amount of light that has passed through a part of the item being inspected.

Still another object is to provide a device for arrangement with a moving column of transparent or translucent items, such as a moving column of glass or plastic food or drink containers, that pass in front of a light source, the device receiving light from that light source after it has passed through each item, producing an output train of pulses each indicative of the light transmission properties of a different portion of the item.

Still another object is to provide a device that can be easily included with existing apparatus for moving transparent or translucent items past an inspection point, automating the inspection process thereof.

Principal features of the present invention include a lens for receiving light after it has passed through a transparent or translucent item under inspection, focusing that received light onto the face of a solid state scanning array. The solid state scanning array contains a number of photo sensitive devices each passing a voltage proportional to the amount of light falling thereon.

A clock is provided to serially interrogate each of the photo sensitive devices producing thereby a train of individual signal pulses as the output of the scanning array. The train of signal pulses are then amplified and passed to a filter-discriminator device for further processing.

A preferred arrangement of the present invention involves positioning the lens across from a light source and moving a line or column of transparent or translucent items therebetween. Each such item thereby passes between the lens and the light source with the lens focusing light passing through that item onto the photo sensitive devices. Serially interrogating the individual photo sensitive devices, allows the light passing qualities of different parts of the item to be evaluated. The amplitude of a particular pulse thereby represents the light transmitting properties of a particular portion of the item, such that the train of pulses produced will represent a cross section of the item.

As a crack, flaw, or foreign object will scatter or gather some of the light directed thereon, the photo sensitive device receiving light from that portion of the item wherein a crack, flaw, or foreign object is present, will reflect that defect by producing a signal of lesser or greater amplitude than adjacent pulses representing light passed unobstructed through the item. Changes in pulse amplitude between adjacent pulses representative of defects or imperfections in the item and, when compared in a filter-discriminator circuit or the like, will produce output signals or pulses that have amplitudes equaling the difference between adjacent pulses in the input train.

As each pulse in the train of pulses represents the light passing qualities of different portions of the item and the differences in pulse amplitudes represent imperfections in the item, the output pulses from the filter-discriminator circuitry can be used to key appropriate timer and item removal means to displace that defective or imperfect item from the line of like items.

Assuming a single perturbation detector arranged to monitor a moving line or column of items, then absent spinning the items as they pass in front of the perturbation detector, flaws, cracks, or foreign objects located at the edge of the item with respect to the perturbation detector might not be discovered due to the light transmission qualities of that item along its edge. One such perturbation detector might therefore not perform a satisfactory or reliable inspection and therefore two such perturbation detectors, angularly spaced from one another, would be preferred.

Further objects and features of the invention will become apparent from the following detailed description, taken together with the accompanying drawings.

THE DRAWINGS

FIG. 1, is an exploded profile perspective view of a perturbation detector of the present invention;

FIG. 2, a block schematic diagram showing the different component stages of the perturbation detector of FIG. 1;

FIG. 3, a block circuit diagram of the perturbation detector of FIG. 1;

FIG. 4A, a representation of a train of pulses produced by the perturbation detector of FIG. 1;

FIG. 4B, a train of clock pulses; and

FIG. 4C, a comparison made in a filter-discriminator circuit of the train of pulses of FIG. 4A, wherein the output is a train of pulses the amplitude or signal strength of each being the difference in amplitude or signal strength of adjacent pulses in the train of pulses.

DETAILED DESCRIPTION

Figure 1:
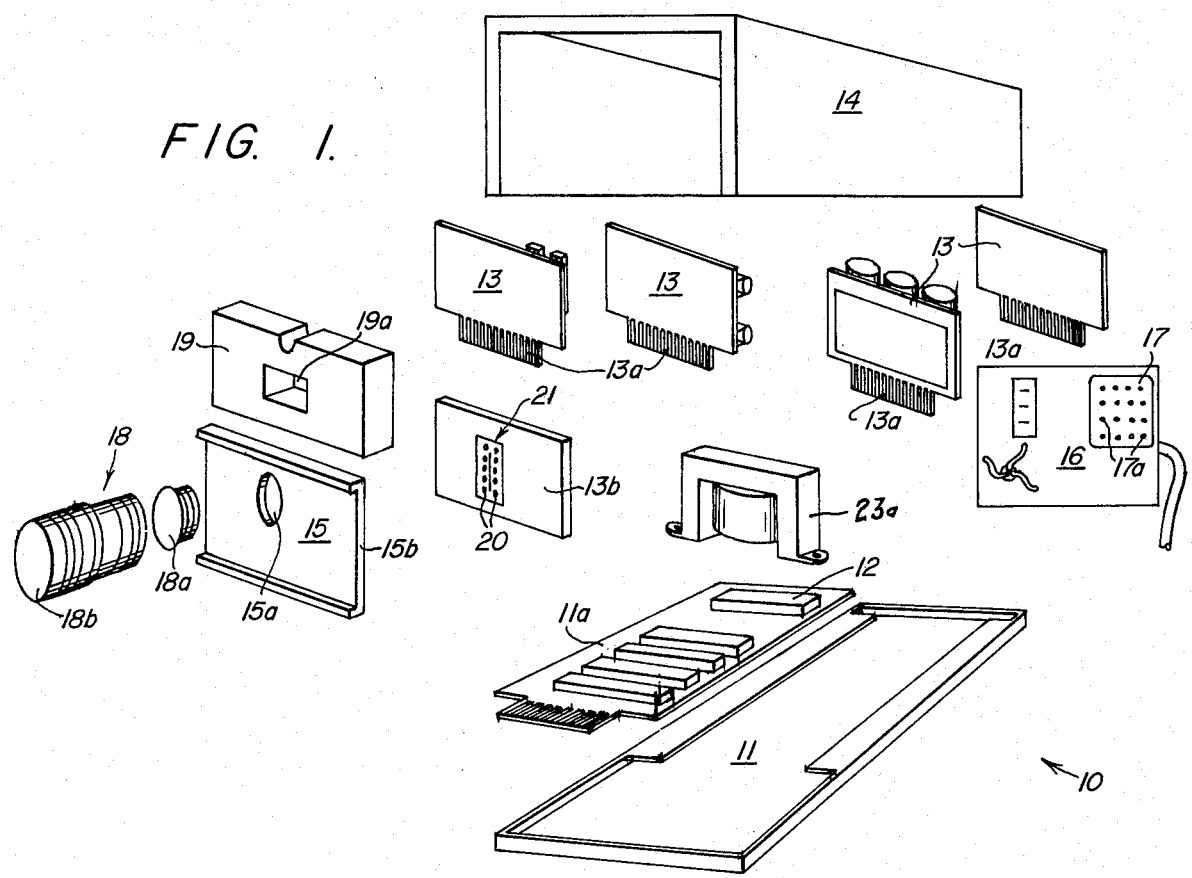

Referring now to the drawings:

Shown best in FIG. 1, the perturbation detector 10 of the present invention consists of a base 11 that mounts a plate 11a whereon a number of female receptacles 12 are arranged thereacross. Each such female receptacle 12, hereinafter referred to as recepticle, has aligned therewith a printed circuit board 13 whereon is arranged printed circuitry and components of the perturbation detector 10. Electrical connection between each such printed circuit board 13 and recepticle 12 is accomplished by inserting appropriately a male plug portion 13a of the printed circuit board 13 into the recepticle 12. The circuitry and components on that particular printed circuit board are thereby connected electrically to the circuitry and components on the other printed circuit boards, forming the electrical circuitry of the perturbation detector, which circuitry is shown in the block schematic of FIG. 2, and in the block circuit diagram of FIG. 3.

A cover 14 is shown in FIG. 1, aligned for installation onto the base 11, over the printed circuit boards 13 installed therein, and a lens cap 15 and end cap 16 are aligned for arrangement over opposite ends thereof. A cannon plug segment 17, is shown installed in the end cap 16. The cannon plug segment has a number of pins 17a arranged therein that connect by wires, not shown, to the components on the printed circuit boards 13 through the mating of the male plug portions 13a into the receipt 12 in the plate 11a.

The lens cap 15 is shown having a lens 18 aligned therewith, the one lens end 18a fitting into a hole 15a in the lens cap. A gasket means 19 is installed to the lens cap side 15b opposite to the lens 18 for engaging to seal out light off from a face of a printed circuit board 13b immediately opposite to said lens cap. The face of the printed circuit board 13b opposite to the lens end 18a mounts a scanning array consisting of a plurality of photosensitive devices, that are preferably photo diodes 20. With the exploded perturbation detector components, shown in FIG. 1, appropriately joined together, the lens end 18a will intersect an opening 19a and fit through the hole 15a in the lens cap gasket means 19, such that light passing through the lens will be focused onto the various photo diodes 20.

Figure 2:
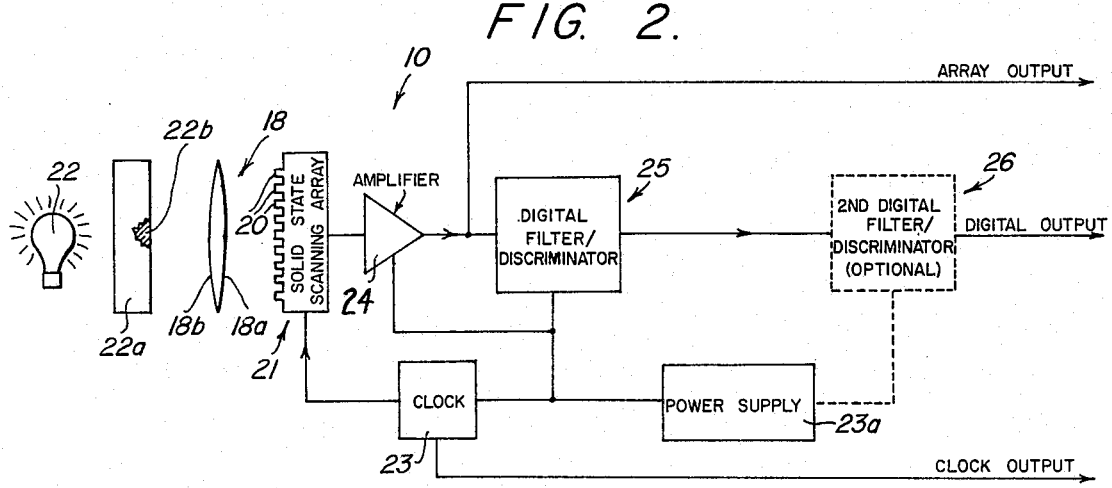

A light source 22 is shown in FIG. 2 on one side of an item 22a to be inspected, which item 22a has a flaw 22b therein. Light from the light source thereby travels through the item, is partially deflected from or gathered into the flaw 22b, and thence passes into the lens end 18b. Item 22a, it should be understood, is one of a plurality of items that make up a moving column or line of such transparent or translucent items, not shown, that move between the light source 22 and lens end 18b. Light from the light source 22 will therefor pass through the item under inspection, and travel into lens 18 wherein it is focused and directed onto the photo diodes 20. Each photo diode 20 receives light that has passed through different segments or portions of the item under inspection. Assuming that the item is without flaws, cracks, or foreign objects therein, then the amount of light striking each photo diode will be the same. Should however such a flaw, crack, or foreign object be present in the item, then light passing through that portion of the item containing such an obstruction will be partially reflected, blocked, or gathered by or into the obstruction and therefore the light passed through such an obstruction will be of lesser or greater intensity than light passing unobstructed through the item.

Each photo diode 20 is a variable resistance device that will pass a voltage therethrough that is reflective or proportional to the amount of light falling thereon. By serially interrogating each photo diode, a series or train of pulses will be produced, each pulse reflecting the amount of light striking that particular photo diode. The train of pulses formed by serially interrogating each photo diode, as will be explained in detail with respect to FIGS. 2 and 3, pass from the scanning array 21 and into an amplifier 24, emerging therefrom as a train of equally amplified pulses, like the train of pulses shown in FIG. 4a. The train of pulses is shown therein having one pulse A' that is of lesser amplitude than the pulses on either side thereof. Pulse A' is produced by a lesser voltage output from the particular photo diode that is due to a lesser amount of light striking the particular photo diode as compared to the amount of light striking the other photo diodes, which less amplitude indicates the presence of a flaw, crack, or foreign object in the item. Also, should the flaw, crack, or foreign object tend to gather light then the pulse produced could be of greater amplitude than surrounding pulses.

Shown in the block schematic diagram of FIG. 2, the perturbation detector 10 consists of the lens 18 that focuses light emitted by the light source 22 and passed through the item 22a, onto the scanning array 21. A clock 23 as represented by FIG. 4b, that receives power from a power supply 23a, is provided for serially interrogating each of the photo diodes in the scanning array, and as a means for synchronizing other circuits for connection to the present invention. As already mentioned hrein, the train of pulses passing from the scanning array 21 are individually applified by passage through the amplifier 24. Thereafter, the train of pulses as represented by FIG. 4A, then pass for comparison and processing into a first filter-discriminator circuit 25, or the like, for producing as the output therefrom a signal, FIG. 4c, which signal contains pulses C' having amplitudes that equal the difference between adjacent pulses in the train of pulses of FIG. 4A. A second filter-discriminator circuit 26, is shown in dotted lines in FIG. 2 as being optionally included to further isolate the greater amplitude pulses that pass from the first filter-discriminator circuit, providing a double derivative of the original train of pulses, FIG. 4A. The second filter-discriminator circuit further elevates the pulses C', FIG. 4C, away from the horizontal axis thereby providing pulses that can be used as trigger pulses to operate equipment, such as a timer and/or "kicker" circuit for eliminating the item sensed as having a flaw, crack, or foreign object from the moving line or column of items 22a.

The first and second filter-discriminator circuits 25 and 26, are not described in detail herein, as they are the subject matter of an application for United States patent simultaneously with the present application for United States patent. Obviously, however, the output of the perturbation detector could be processed devices or circuits other than the filter-discriminator circuit shown herein, providing thereby a useful signal output without departing from the subject matter coming within the scope of this invention.

In FIG. 3, is shown a block circuit diagram of the perturbation detector 10 of the present invention. Blocks 23 and 28 therein, reflect the described clock and a start pulse generator respectively. The clock 23, is connected through wire 27 to an integrated circuit 29 that contains flip-flop and like circuitry for generating opposite phase signals. Such generated opposite phase signals then pass simultaneously through connecting lines 30a and 30b, and into a dual mos driver 31. An electrical path is also provided from the integrated circuit 29 through a line 32. The voltage passing through the line 32 travels through a diode 33 and intersects a line 34 loading from the start pulse generator 28. The diode 33 is faced, as shown in FIG. 3, to act as a valve prohibiting an electrical flow from the start pulse generator 28 into the integrated circuit 29.

A signal from the start pulse generator 28 will travel through the line 34 and into integrated circuit 35, which integrated circuit also receives clock pulses, as has already been described, through lines 32 and 34 to syncronize and shape the start pulse to initiate the interrogation of the photo diodes 20 of the scanning array 21. One side of the signal output of the integrated circuit also receives the signal output from the integrated circuit 29 through a line 36, holding the integrating circuit 35 in a voltage passing attitude and for start pulse shaping generation. The integrated circuit 35 connects through line 37 to the scanning array 21 which scanning array also receives opposite phase square wave signal outputs D and D' from the dual mos driver 31 through lines 38a and 38b.

In operation, the perturbation detector is turned on by generating a start signal pulse from the start signal pulse generator 28, which pulse opens flip-flop circuitry within the integrated circuit 35 so as to transmit a start pulse through the line 37 to the scanning array 21. Simultaneously, the clock 23 commences sending pulses through the line 27 to the integrated circuit 29, generating opposite phase signal outputs therefrom, that flow to the dual mos driver 31, and directing a signal through the line 32, past the diode 33, and into line 34. The signal flow from the integrated circuit 29 through lines 32 and 34 and line 36 provides, even should the start pulse be discontinued, pulse signals to maintain the integrated circuit 35 in a voltage passing attitude, the voltage pulses thereby travel through line 37 serially interrogating the photo diodes in the scanning array 21. The clock pulses from the dual mos driver 31 reach the scanning array through lines 38a and 38b, simultaneously with the pulses arriving through line 37, providing cycling commands for serially interrogating each of the photo diodes making up the scanning array. The interrogation, in turn, produces the described pulses of equal or unequal amplitude, which pulse amplitude depends upon the amount of light striking the particular photo diode 20. The pulses from each photo diode 20 pass therefrom as a train of pulses traveling through a line 39 to amplifier 24. The amplifier 24, uniformly amplifies each of the train of pulses and passes the signal through a line 40 connecting into the described filter-discriminator circuits 25 and 26 or into a like circuit.

Assuming that the light received on each photo diode is the same, then the amplitudes of the individual pulses will be exactly alike, reflecting identical light passing properties of the item. The comparison is made between adjacent pulses in the train, and not against any model or the like, and therefore, it is a difference in light intensity sensed by one of the photo diodes that determines the individual pulse amplitude. A flaw, crack, or foreign object, of course, changes those light transmitting properties, resulting in the generation of a pulse of lesser or greater amplitude. The present invention provides for a comparison of the light transmitting properties of essentially a cross sectional area of a single item to determine the presence of an imperfection. Should, therefore, such an imperfection happen to lie along an edge of that item with respect to the positioning of the end 18b of lens 18, then that imperfection might not show up because the light transmitting properties of the edge of such an item would be somewhat different the mid portions thereof. A flaw at such an edge might therefore be missed. It is therefore necessary so as to insure the reliability of the present invention, when incorporated with a moving line of transparent or translucent items, that the items be turned during passage by the lens 18, or a plurality of such perturbation detectors be included each separated angularly from one another, and arranged to view the line simultaneously viewing the same passing item, but from different points, thereby eliminating the need to turn the items under inspection.

It has been specifically pointed out herein, that the pulse amplitudes produced in the present invention reflect the light transmitting properties of the item under inspection. The light transmitting properties of the item itself provides the standard for determining whether an imperfection exists in the item. Theoretically, therefore, a line or column of items each having different light transmitting properties could be passed by the apparatus of the present invention and checked appropriately without necessitating any adjustments or calibrating thereof.

Although a preferred embodiment of our invention has been herein described, it is to be understood that the present disclosure is made by way of example and that variations are possible without departing from the subject matter coming within the scope of the following claims, which subject matter we regard as our invention.

We claim:

1. A flaw detector comprising:
   a housing;
   a lens arranged in said housing;
   a scanning array arranged in said housing having a plurality of photo sensitive devices associated therewith, which photo sensitive devices are positioned to receive light passing through said lens;
   a source of electrical power connected to supply power to said photo sensitive devices;
   means for sequentially interrogating each said photo sensitive device, each said photo sensitive device producing in said interrogation a pulse reflective of an amount of light striking thereon, which interrogation produces a train of pulses as an output from said scanning array;
   amplifier means receiving said train of pulses for increasing the signal strength of said pulses; and
   means for interpreting said train of pulses, comparing the amplitudes of adjacent pulses, and providing a signal output therefrom that is reflective of the differences between adjacent pulses.

2. A flaw detector as recited in claim 1, wherein the photo sensitive devices are photo diodes.

3. A flaw detector as recited in claim 1, wherein the means for serially interrogating each photo sensitive device consists of:
   a clock; and
   means for introducing pulses from said clock into the scanning array such that said photo sensitive devices are serially interrogated.

4. A method for detecting flaws in transparent and translucent items comprising:
   passing said item in front of a light source;
   receiving light passed through said item in a lens;
   focusing light with said lens onto an array of photo sensitive devices having a voltage potential supplied thereto;
   serially interrogating said photo sensitive devices;
   producing a pulse from each whose amplitude is a function of the amount of light striking thereon; and
   passing said pulses to a circuit for comparing adjacent pulses producing from such comparisons output pulses having amplitudes that are equal to the differences in amplitude of adjacent input pulses.

* * * * *